United States Patent [19]

Singhal et al.

[11] 3,969,265

[45] July 13, 1976

[54] NOVEL LIQUID MEMBRANE FORMULATIONS AND USE THEREOF

[75] Inventors: Gopal H. Singhal, Westfield, N.J.; Martin L. Gorbaty, Baytown, Tex.; Richard M. Minday, North Plainfield; Norman N. Li, Edison, both of N.J.

[73] Assignee: Exxon Research and Engineering Company, Linden, N.J.

[22] Filed: June 24, 1976

[21] Appl. No.: 482,592

[52] U.S. Cl. .................................. 252/309; 210/21; 252/308; 260/29.6 SQ; 260/29.7 B
[51] Int. Cl.² ...................... C08D 7/00; C08D 7/10
[58] Field of Search .............. 260/29.6 SQ, 23.7 B, 260/29.7 EM, 29.7 B; 252/DIG. 2, 308, 309; 210/21; 55/16; 106/308 M

[56] References Cited
UNITED STATES PATENTS

| | | | |
|---|---|---|---|
| 2,944,038 | 7/1960 | Hunter et al. | 260/23.7 B |
| 3,243,400 | 3/1966 | Lipton et al. | 260/23.7 B |
| 3,770,682 | 11/1973 | Hubbard et al. | 260/29.6 SQ X |

Primary Examiner—Frank A. Spear, Jr.
Attorney, Agent, or Firm—Robert J. Baran; Joseph A. Allocca

[57] ABSTRACT

This invention relates to novel liquid membrane formulations which are water-in-oil emulsions wherein the oil phase comprises a sulfonated polymer having a backbone which is substantially nonaromatic, for example, less than 10 mole % aromatic, and uses thereof in high temperature liquid membrane processes. The emulsions are useful in liquid membrane water treating processes, especially in water treating processes which are desirably run at high temperatures. In the most preferred embodiment, these compositions are used in a liquid membrane sour water treating process wherein a waste water stream containing ammonium sulfide is contacted with a liquid membrane emulsion, i.e., the emulsions of the instant invention, at conditions whereby ammonia permeates through the external phase of the emulsion into an acidic internal phase wherein it is converted to a nonpermeable form, e.g., ammonium ion, while $H_2S$ is continuously stripped out of the waste water solution by means of an inert gas, e.g., steam. Processes of this sort are most effectively carried out at temperatures greater than 80°C. wherein the emulsions of the instant invention have excellent stability.

15 Claims, No Drawings

NOVEL LIQUID MEMBRANE FORMULATIONS AND USE THEREOF

FIELD OF THE INVENTION

This invention relates to novel liquid membrane formulations which are water-in-oil emulsions wherein the oil phase comprises a sulfonated polymer having a backbone which is substantially nonaromatic, for example, less than 10 mole % aromatic, and uses thereof in high temperature liquid membrane processes. The emulsions are useful in liquid membrane water treating processes, especially in water treating processes which are desirably run at high temperatures. In the most preferred embodiment, these compositions are used in a liquid membrane sour water treating process wherein a waste water stream containing ammonium sulfide is contacted with a liquid membrane emulsion, i.e., the emulsions of the instant invention, at conditions whereby ammonia permeates through the external phase of the emulsion into an acidic internal phase wherein it is converted to a nonpermeable from, e.g., ammonium ion, while $H_2S$ is continuously stripped out of the waste water solution by means of an inert gas, e.g., steam. Processes of this sort are most effectively carried out at temperatures greater than 80°C. wherein the emulsions of the instant invention have excellent stability.

DESCRIPTION OF THE PRIOR ART

In U.S. Ser. No. 382,466, filed July 25, 1973, in the names of N. N. Li and R. P. Cahn, a process for removing the salt of a weak acid and a weak base from solution by means of the liquid membrane technology disclosed in U.S. Pat. Nos. 3,410,794, 3,617,546 and 3,779,907, all herein incorporated by reference, is disclosed. The process disclosed in U.S. Ser. No. 382,466 utilizes the liquid membrane technology to remove either the weak acid or weak base or their hydrolysis products from solution by permeating through the external phase of the liquid membrane emulsion, and converting same into a nonpermeable form in the interior phase. Simultaneously the weak acid or weak base or hydrolysis product thereof may be stripped from solution by means of an inert gas or alternatively by subjecting the system to subatmospheric pressures. This process has been found to be most effective when run at high temperatures, for example, 80°C. It has been found, however, that at temperatures in this range, many liquid membrane formulations, i.e., water-in-oil emulsions, are unstable. In the process of this invention, this problem is solved by means of novel formulations which have been found to be stable at temperatures up to 100°C.

SUMMARY OF THE INSTANT INVENTION

The instant invention relates to novel liquid membrane formulations which are water-in-oil emulsions wherein said oil phase comprises a sulfonated polymer having a backbone which is substantially nonaromatic. These novel compositions also comprise a solvent for said sulfonated polymer which is immiscible with water, and although, not necessary, an oil-soluble surfactant may also be used in the formulation. The aqueous interior phase of these emulsions may comprise a base or an acid. The emulsions of this invention are especially suitable for use in liquid membrane processes wherein aqueous solutions are treated at high temperatures with liquid membrane formulations. Furthermore, when these emulsions are being utilized in the preferred process for treating sour water, the emulsions will usually comprise either a strong acid or a regenerable acid. The regenerable acids used in forming the compositions of the instant invention are fully described in U.S. Ser. No. 382,466.

The liquid membrane formulations of the instant invention, as stated above, will comprise a sulfonated polymer wherein the backbone of said sulfonated polymer is substantially nonaromatic. In general, sulfonated polymers which are useful in the compositions and process of the instant invention are disclosed and claimed in U.S. Pat. No. 3,642,728 herein incorporated by reference. The term "substantially nonaromatic in nature" means that the backbone will comprise less than 25 mole %, preferably less than 10 mole % aromatic groups. This is a necessary limitation since it has been found, unexpectedly, that aromatic-containing sulfonated polymers do not form stable emulsions with the solvent systems utilized in certain higher temperature liquid membrane processes, e.g., liquid membrane sour water treating.

The preferred sulfonated polymers of the instant invention are selected from the group consisting of sulfonated butyl polymers and sulfonated ethylene-propylene copolymers. Most preferably, compositions of the instant invention comprise a sulfonated butyl polymer. The butyl polymer is prepared by copolymerizing isobutylene and isoprene, alteratively with a third monomer, e.g., cyclopentadiene. The preferred sulfobutyl polymers of the instant invention will contain from about 0.25 to 10 mole % sulfonic acid groups, more preferably from about 0.5 to 5 mole % sulfonic acid groups. This copolymer may be prepared by the methods described in U.S. Pat. No. 3,642,728. The preferred sulfobutyl polymer of the instant invention will have a number average molecular weight of at least 1,000, preferably from 5,000 to 50,000.

Other sulfonated polymers which are operable in making the compositions of the instant invention may be selected from the group consisting of sulfonated copolymers of isobutylene and piperylene, isobutylene and cyclopentadiene, isobutylene and methylcyclopentadiene, and isobutylene and beta-pinene. The diene composition of these polymers may range from 0.5 to 30%, preferably 1 to 25 mole %. Various sulfonated terpolymers are also useful in preparing the compositions of the instant invention. For example, isobutylene may be copolymerized with any two of the above conjugated dienes and the resulting copolymer sulfonated in accordance with the teachings of U.S. Pat. No. 3,642,728 to yield sulfonated polymers useful in the instant invention.

Other less preferred copolymers for use in the instant invention are prepared by copolymerizing ethylene and propylene with a diene, e.g., dicyclopentadiene, ethylidene norbornene, or 1,6-hexadiene and sulfonating the copolymer as described above. These terpolymers may have from 0.2 to 10 mole % unsaturation and more preferably from 0.5 to 7% prior to sulfonation.

Finally, highly unsaturated nonaromatic polymers may be sulfonated and used in preparing the compositions of the instant invention. For example, polybutadiene and polyisoprene homopolymers may be so utilized.

The polymers described above, in general, will contain from 0.25 to 20 mole % sulfonic acid groups, preferably from 0.5 to 5 mole % sulfonic acid groups, and have a number average molecular weight of at least 1,000, preferably from 5,000 to 50,000.

The use of emulsions prepared from sulfonated polymers is not restricted to sour water treatment. They have a very wide utility in other liquid membrane processes. In systems involving strong acids and/or bases, these emulsions are particularly advantageous since the sulfonated polymers, described above, act as emulsifying agents, and unlike many surfactants are not prone to hydrolysis under the conditions of use.

In cases where high temperatures and strong acids or bases are used, it is essential that solvent for the sulfonated polymer be selected judiciously. Thus, solvents such as esters which can hydrolyze easily should not be used. Another restriction is volatility of solvents. Thus, hydrocarbons and other solvents which are volatile at 80°C. or are steam distillable cannot be used. Another criteria for selection of solvents in water-treating processes is toxicity. Solvents which leave a toxic residue in water must be avoided. It is also important that solvents used in this process should be liquids under the operating conditions to provide liquid membranes and should not have a tendency to solidify during use. The solvent should also be selected so that the specific gravity of the formulated emulsion differs from that of the feed stream, with which it is to be contacted by at least 0.025, to allow easy separation of the emulsion from the feed. Thus, if the difference between the specific gravity of the feed stream and the emulsion is too small, the separation thereof is a time-consuming process. Other considerations will be apparent to those skilled in the art. For the reasons given above, the preferred solvent will be chosen from the following group.

Petroleum distillates having a boiling point of >200°C. Higher boiling normal paraffins which have a melting point of 70°C. or more should not be used, unless they are mixed with other solvents to lower their melting points. Paraffinic solvents, which may be lightly substituted with halogens such as chlorine or benzene or cycloalkyl rings, i.e., less than 10 mole %. Preferred solvents include the petroleum distillates known as isoparaffins having an average carbon number of from about 10 to about 100, most preferably from 30 to 75. Examples of solvents of this type are the refined isoparaffins known as Solvent Neutral types, available from Exxon Chemical Company. Almost all of these are suitable in the instant invention, e.g., Solvent Neutral 100, Solvent Neutral 150, Solvent Neutral 600 and the various grades inbetween. (The numeral refers to the SUS viscosity at 100°F.) Other petroleum fractions such as bright stock, Coray 90 and the like are also suitable. These are petroleum lubricating oils having viscosities of 479.4 and 412.2 centistokes, respectively, at 100°F. In many applications, it may also be desirable to use mixed solvents such as, for example, Solvent Neutral 100 and Solvent Neutral 600, in combination.

The most preferred form of the sulfonated polymers used in preparing the compositions of the instant invention is the free acids, although long chain amines or polyamines can be used as neutralizing agents. The amines useful as neutralizing agents include triamines, e.g., containing $C_6$ to $C_{16}$ hydrocarbyl radicals, such as, for example, trioctylamine; and diamines, e.g., containing $C_8$ to $C_{16}$ hydrocarbyl radicals, such as, for example, didodecylamine. The amines are selected on the basis of their lack of solubility in water. If these amines or their salts have appreciable solubility in water, they are likely to be lost when strong acids and bases are utilized in the internal phase.

As will be described later, salts of these sulfonic acids such as ammonium, potassium, sodium, etc., are not particularly useful in these applications due to the lack of their solubility in the solvent system used.

The polymers containing free sulfonic acid groups are prepared by first sulfonating the copolymers such as, for example, isobutylene-isoprene copolymer as described in U.S. Pat. No. 3,642,728 and then replacing the solvents used in their preparation such as methylene chloride, volatile hydrocarbons and the methanol quenching agent by the solvent desirable for emulsion formation, e.g., Solvent Neutral 100 or Solvent Neutral 600. This process is known in the art as solvent replacement. Another method is to neutralize the salts of these sulfonic acid polymers with an acid, e.g., sulfuric acid, and extract the polymer with the desired solvent. Solutions of these polymers when stored in amber-colored bottles are indefinitely stable. The concentration of the sulfonic acid polymers used in preparing the compositions of the instant invention may vary from 0.05 to 40 wt. %, preferably from 0.1 to 30 wt. %, in the solvent.

In many liquid membrane processes, such as sour water treatment, it is desirable to maximize rate of ammonia transfer to internal phase as well as the removal of $H_2S$ by the inert gas, e.g., steam, or by subatmospheric pressures. This is accomplished by carrying out the process at temperatures higher than ambient wherein the vapor pressure of $H_2S$ increases substantially and its solubility in water is decreased. Thus, at 25°C. the solubility of $H_2S$ in water at 25° is 0.34% and at 90°C. it is 0.04%. It is evident that when running this process at atmospheric pressure, a temperature of 80° to 85°C. would be very practical.

In various liquid membrane processes such as sour water treatment, it is desirable to use strong acids or bases in the internal phase of the emulsion. Unfortunately, with the increase in temperatures, the hydrolysis rate of commonly used surfactants, such as Span 80, an oleic acid ester increases drastically. Thus, many surfactants are generally unsuitable for use at these higher temperatures when strong acids or bases are present.

One of the outstanding advantages in using the sulfonic acid polymers described above is that no additional surfactant is needed to stabilize the emulsion, thus, risk of hydrolysis and/or decomposition at higher operating temperatures is avoided. The sulfonated polymers provide both additive and surfactant properties needed in the liquid membrane processes, and are not subject to the above-described disadvantages of the commonly used surfactants. Also, the sulfonic acid polymers possess the proper hydrophiliclipophilic balance at the operating temperatures, e.g., temperatures of from 80° to 100°C. It has been noted that unlike many other additives, e.g., polyisobutylsuccinic anhydridetetraethylenepentaamine, commonly used at the operating temperatures described above, the sulfonic acid polymers are inert to hydrogen sulfide attack, in liquid membrane processes.

All of the above factors make the sulfonic acid polymers described above particularly suitable for forming emulsions, useful in high temperature liquid membrane processes especially liquid membrane sour water treating processes.

The above components, that is sulfonated polymer, solvent with or without a surfactant, are selected with consideration of their interaction to form emulsions which are stable at high temperatures and especially in the presence of strong acids and bases. The choice of specific combinations is within the skill of the artisan in the field of emulsion technology with the teaching of this disclosure before him. In general, the emulsions of the instant invention are prepared by techniques known in the art. For example, the sulfonated polymer may be dissolved in the solvent followed by the addition and dissolution of the surfactant. However, the components can be combined in any order. The aqueous internal phase may then be added to the oil phase while agitating with any of the devices known in the art for preparing stable emulsions. For example, paddles with a stirrer operable at high speeds may be used to emulsify the components.

Other well-known emulsion-forming techniques which may be utilized include the use of colloid mills in which large droplets are broken up by the intense shearing forces. Homogenizers can also be used after a preliminary emulsification in a mixing vessel, colloid mill, or other device. In this type of operation, the coarse emulsion is pumped at a high velocity through the annular opening of a valve. The droplets are disrupted, partly by the simple "sieving action" and partly by the intense shearing forces which are set up in the annulus. Other emulsifying devices resemble the intense types just described, such as special mixing pumps, centrifugal emulsifiers, ultrasonic generator, slotted mixers, mixing jets including those in which ultrasonic vibration occurs and turbulent flow devices in which a coarse emulsion is made to flow along a tube at a speed greater than the critical velocity for turbulence.

In general, the compositions of the instant invention will comprise from 10 to 90, preferably 30 to 60 wt. % oil phase and the remainder the aqueous internal phase.

The internal phase may comprise a strong acid or a strong base or any of the other reagents described in U.S. Pat. No. 3,779,907. However, these emulsions, as stated above, are especially useful in the process described in U.S. Ser. No. 382,466. Thus, preferably, in the composition of the instant invention, the internal phase, is as described therein. Most preferably the internal phase will comprise either an acid (strong or regenerable) or a strong base. The concentration of acid or base in the internal phase of the emulsion is adjusted so that the emulsions may be used economically. In general, the concentration is as high as possible, even up to saturation, taking into consideration the stability of the emulsion, e.g., from 1 to 30% by weight concentrations may be used.

The following are specific embodiments of the instant invention.

EXAMPLE 1

To a vigorously stirred (1,000 to 2,000 RPM) solution of 13.6 of butyl rubber sulfonated to 2% level in 186.5 g of Solvent Neutral 100 at 85°C. was added dropwise 186 ml of 10% aqueous sulfuric acid solution. 180 g of the emulsion thus produced was added with stirring (150 to 250 RPM) to 740 ml of water containing 1,720 ppm of $NH_4^+$ as ammonium hydroxide and 2,800 ppm of sulfide as $H_2S$. Samples of water solution were withdrawn by a pipette at 1 minute, 5 minute, 15 minute, 30 minute, 60 minute and 90 minute intervals by allowing the emulsion to settle and taking a sample of lower aqueous layer. The temperature was maintained at 80° to 85° throughout the run.

The ammonium concentration gradually reduced to 42 ppm in 30 minutes and the emulsion was stable over the entire length of experiment (90 minutes).

EXAMPLE 2

The experiment in Example 1 was repeated. The concentrations of $NH_4^+$ and $S^=$ were 1,700 ppm and 2,240 ppm, respectively. In this experiment, steam was passed at 85° through the mixture with stirring. The concentration of ammonium ions was reduced in 30 minutes to 34 ppm and sulfide ions to <20 ppm. The emulsion was again stable over the entire length of the experiment (90 minutes).

EXAMPLE 3

The experiment given in Example 1 was repeated using 2.5 wt. % of the sulfonated butyl rubber in the oil phase. The internal phase contained 2.13 wt. % sulfuric acid. The emulsion was contacted with feed for 5 minutes. The concentration of $NH_4^+$ was determined at the beginning and end of the experiment. After this time, the feed was removed and the same emulsion was contacted with a fresh feed for 5 minutes. The process was repeated two more times. The temperature was maintained at 85° for the entire length of the experiment. The concentration of $NH_4^+$ in the four feeds were 118, 137, 143, and 186 ppm and were reduced to 1, 1, 1.75 and 2 ppm, respectively.

This demonstrates the suitability of single emulsion in repeated applications.

EXAMPLE 4

The experiment given in Example 1 was repeated with 12% Lubrizol 3702 (a product of Lubrizol Corp.) in place of sulfonated butyl rubber in the formulation described therein. The concentration of ammonium ions was 2,040 ppm and that of sulfide ions 1,970 ppm. Within 15 minutes of the start of the experiment, the entire mass had gelled and samples could not be withdrawn for ammonium analysis.

EXAMPLE 5

The experiment given in Example 1 was repeated with 4% PIBSA-TEPA, the reaction product of polyisobutylene-succinic anhydride and tetraethylenepentamine (a product of Lubrizol Corp.) and 1% SPAN 80. Within 15 minutes the entire reaction mixture had gelled and it was not possible to withdraw samples for ammonium analysis.

EXAMPLE 6

The experiment given in Example 1 was repeated with initial $NH_4^+$ concentration of 1,900 ppm but no $H_2S$. Within 30 minutes the concentration of $NH_4^+$ was reduced to 3 ppm.

Comparison of Effectiveness of Polymers Sulfonated to Different Levels

EXAMPLE 7

- Unsulfonated Polymer

To a vigorously stirred solution of 13.6 g of butyl rubber (copolymer of isobutylene with 5 mole % isoprene, same as was used for preparing sulfonated polymers and 4 g of surfactant Span 80 in 182.4 g of Solvent Neutral 100 was added dropwise, 166 g of 10% sulfuric acid solution. The resulting emulsion which looked normal at room temperature was heated to 85° in order to carry out the treatment of sour water. During heating, the emulsion started breaking and as the temperature reached 80° organic layer separated out completely from aqueous layer. This demonstrates that the emulsion does not possess any stability under the operating conditions even though an external surfactant was present.

EXAMPLE 8

- Polymer Sulfonated to 1 Mole % Level

The experiment given in Example 1 was repeated using the same concentration of butyl rubber sulfonated to 1 mole % level. The initial $NH_4^+$ concentration of 1,960 ppm was reduced to 4 ppm within 30 minutes and the emulsion was stable over the length of the experiment (40 minutes).

EXAMPLE 9

- Polymer Sulfonated to 4 Mole % Level

The experiment given in Example 1 was repeated using the same concentration of butyl rubber sulfonated to 4 mole % level. The resulting emulsion was very thick. The initial $NH_4^+$ concentration in the feed was 2,040 ppm. Within 15 minutes the entire mass gelled and it was not possible to carry out the experiment further.

These experiments demonstrate that about 1 mole % sulfonation is desirable in the sulfonic acid polymers used in preparing the compositions of the instant invention; however, amounts greater than about 4% are not as effective.

The experiments given in Examples 9, 10 and 11 were designed to determine the effect of smaller amount of polymer sulfonated to 4% level on the stability of the membrane.

EXAMPLE 10

-Polymer Sulfonated to a 4 Mole % Level

An emulsion was prepared by encapsulating 186 g of 10% sulfuric acid solution in a solution of 1.5 g of butyl rubber sulfonated to 4% level in 198.5 g of Solvent Neutral 100 at 85°C. One half of this emulsion was contacted with a feed solution containing 1,960 ppm of ammonium hydroxide in the usual way. The emulsion had a tendency to stick too much to the sides of the reaction vessel and very poor separability from the feed water. In effect, quite a significant part of the emulsion could not be made to contact the feed solution. In order for the emulsion to be workable, it is important that the emulsion can be easily dispersed in the form of tiny droplets so as to provide a very large surface area to effectively and rapidly remove any contaminant. In this case the concentration of $NH_4^+$ was reduced to 80 ppm in 30 minutes but increased to 100 ppm in 60 minutes, indicating a weakness of the membrane.

EXAMPLE 11

- Polymer Sulfonated to 4 Mole % Level

The experiment given in Example 9 was repeated with 3.0 g of butyl rubber sulfonated to 4% level instead of 1.5 g as given in the preceding example. The concentration of $NH_4^+$ in the feed was 2,160. This concentration was reduced to 90 ppm in 30 minutes. However, the emulsion gelled completely in 55 minutes.

These experiments point out that levels of sulfonated polymer of at least 1 wt. % in the external phase are desirable.

COMPARISON OF EFFECTIVENESS OF SULFONATED POLYMERS WITH DIFFERENT MOLECULAR WEIGHT

The experiments given in Examples 12–14 were designed to determine the effect of molecular weight on the membrane strength and their efficacy in treatment of sour water. It was observed that with concentration of polymer in the range of 3 to 6% emulsions were very thick pastes and could not be handled while the emulsions containing very low concentrations of sulfonated high molecular weight polymer lacked dimensional stability and had a tendency to gel easily.

EXAMPLE 12

-Isobutylene-Isoprene Copolymer of Molecular Weight 150,000 (Number Average) Sulfonated to 1 Mole % Level An emulsion was prepared according to the procedure given in Example 1, using 0.85% of high molecular weight sulfobutyl (number average 150,000) instead of 6.8% low molecular weight sulfobutyl (number average 15,000). It was contacted with a feed solution containing 2,400 ppm of $NH_4^+$. The concentration of $NH_4^+$ was reduced to 21 ppm in 30 minutes, but soon after this time the entire mass gelled.

EXAMPLE 13

The experiment given in Example 11 was repeated with 0.40% high molecular weight sulfobutyl. It was contacted with a feed solution containing 2,080 ppm of $NH_4^+$. The concentration of $NH_4^+$ was reduced to 145 ppm in 15 minutes. However, the entire mass gelled in 25 to 30 minutes.

EXAMPLE 14

The experiment given in Example 11 was repeated using 1 wt. % sulfoEPT (number average molecular weight 80,000; prepared by sulfonating ethylene-propylene-ethylidenenorbornene to 1 mole % level). The concentration of $NH_4^+$ was reduced from 2,040 ppm to 12 ppm in 15 minutes. After 60 minutes, however, the entire mass had emulsified and the concentration of $NH_4^+$ had increased to 25.4 ppm.

These experiments indicate that low molecular weight sulfonic acid polymers are desirable in preparing compositions of the instant invention, e.g., molecular weights of from 5,000 to 50,000.

Salts of Sulfonated Polymers

In order to study the efficacy as additives in liquid membranes, sodium, ammonium, and potassium salts were prepared by neutralization of low molecular weight (number average molecular weight 15,000) isobutylene-isoprene copolymer sulfonated to 1% and 2% level with corresponding bases. Attempts were made to prepare a 5% solution of these salts in Solvent Neutral 100. All of these salts were insoluble at 25°C. and 80°C. Of these, the potassium salt of polymer sulfonated to 2% level displayed the best solubility behavior. Its use in liquid membrane is described in Example 15.

EXAMPLE 15

A 5% solution of the potassium salt of sulfobutyl (containing 2 mole % sulfonate groups) was prepared in Solvent Neutral 100 by heating to 85°C. and adding 0.5 cc of Bryj 30 (TM Atlas Chemical Company, Wilmington, Delaware). An emulsion was prepared from the solution by encapsulating 83 g of 1% sulfuric acid solution. This emulsion was contacted with a feed containing 109 ppm $NH_4^+$. In 60 minutes the $NH_4^+$ concentration was reduced to 46 ppm. However, the feed was very cloudy. This demonstrates that these salts may have very marginal utility as membrane additives in sour water treatment.

Use of Acids Other Than Sulfuric Acid in Sour Water Treatment

EXAMPLE 16

An emulsion was prepared from 100 g of a solution of 6.8 g of sulfobutyl in Solvent Neutral 100 as oil phase and 83 g of 16.9% polyacrylic acid (number average molecular weight 50,000 a product of Polysciences, Inc., Warrington, Pa.) as the internal phase. The emulsion was contacted with 740 g of an aqueous feed containing 2,400 ppm of $NH_4^+$ at 85°. Within 30 minutes the concentration of $NH_4^+$ was reduced to 37.5 ppm and the emulsion was stable over the entire length of the experiment (90 minutes).

EXAMPLE 17

The experiment given in Example 16 was repeated with 28% aqueous glutaric acid as internal reagent. The temperature of operation was 85°C. and the feed contained 2,020 ppm of $NH_4^+$ and 1,040 ppm of $H_2S$. After 29 minutes the concentration of $NH_4^+$ was reduced to 78 ppm and $H_2S$ to less than 20 ppm.

When phosphoric acid or succinic acids are used in the above example similar results are obtained.

EXAMPLE 18

An emulsion was prepared from 467 g of 17.5% aqueous polyacrylic acid and 1.75 g of sulfobutyl in 270 g of Solvent Neutral 100. It was contacted with 1,450 ml of sour water from a refinery containing 2,120 ppm of $NH_4^+$ and 815 ppm $S^=$. In 19 minutes the concentration of these ions had dropped to 203 ppm and less than 5 ppm, respectively.

EXAMPLE 19

An emulsion was prepared from 6% by weight of low molecular weight sulfobutyl 4 wt. % trioctylphosphine oxide, 0.1 wt. % of trioctylamine, and 90 wt. % of Solvent Neutral 100 as membrane phase and 4.2 wt. % sodium hydroxide as the aqueous internal phase. The weight ratio of external to internal phase was 1:1 . 190 g of this emulsion was contacted, with agitation, with 800 ml of feed, containing 77 ppm of chromium as sodium dichromate at pH 1.6. Within 5 minutes, the concentration of chromium in the feed was reduced to less than 0.5 ppm.

The following examples demonstrate the difficulties encountered in trying to use sulfonated polystyrene, i.e., aromatic sulfonates. It is clear that these polymers do not dissolve in the solvent systems which are desirably used and if dissolved in a suitable solvent are precipitated out upon the addition of the desired solvents.

EXAMPLE 20

To 100 ml of Solvent Neutral 100 was added 2 g of polystyrene sulfonated to 0.81 mole % level. The mixture was magnetically stirred for 24 hours and then filtered. The residue was washed with isopropanol. It was dissolved in benzene and precipitated by addition of propanol. The precipitated solid was collected and dried. The weight of polymer recovered was 2.0 g which amounts to quantitative recovery.

EXAMPLE 21

The experiment given in Example 20 was repeated using 2 g of polystyrene containing 2.70 mole % sulfonic acid groups. The recovery of polymer was almost quantitative.

EXAMPLE 22

The experiment given in Example 21 was repeated with the difference that the mixture was stirred at 50° to 60°C. The recovery of polymer was again almost quantitative.

EXAMPLE 23

A solution was prepared by dissolving 1.5 g of polystyrene sulfonated to 0.81 mole % level in 100 ml of xylene. To the solution, 100 ml of Solvent Neutral 100 was added. The polymer precipitated out as an oil. The supernatant liquid was decanted off. The polymer was dissolved in 50 ml of benzene, reprecipitated by pouring into isopropyl alcohol, collected and dried. The weight of recovered polymer was 1.1 g.

EXAMPLE 24

The experiment given in Example 23 was repeated using 1.5 g of sulfostyrene containing 2.70 mole % sulfonation. The weight of recovered polymer was 1.35 g.

It must be concluded that polymeric aromatic sulfonic acid derivatives are unsuitable for preparing the compositions of the instant invention.

What is claimed is:

1. A water-in-oil emulsion consisting of from 10 to 90 weight % of an exterior oil phase consisting of (a) a sulfonated polymer having a number average molecular weight of from about 1,000 to about 50,000, said sulfonated polymer comprising a substantially nonaromatic backbone and from 0.2 to 20 mole % sulfonic acid groups, the polymer being present at from 0.05 to 40 weight % based on weight solvent and (b) a solvent for said sulfonated polymer as the oil phase of the emulsion, said solvent being selected from the group consisting of petroleum distillates having a boiling point of greater than 200°C; paraffinic solvents bearing substituents selected from the group consisting of halogen, benzene and cycloalkyl rings; isoparaffins having an average carbon number of from about 10 to about 100 and combinations thereof and a reactive interior aqueous phase selected from the group consisting of aqueous acid and aqueous base, said reactive interior aqueous phase constituting the balance of the emulsion.

2. The composition of claim 1 wherein said sulfonated polymer is selected from the group consisting of sulfonated butyl rubber and sulfonated ethylene-propylene copolymers.

3. The composition of claim 2 wherein said polymer has a sulfonic acid content of from about 0.2 to about 4 mole %.

4. The composition of claim 3 wherein said sulfonic acid groups are neutralized to form their corresponding salts with a basic compound selected from long chain secondary or tertiary amines.

5. The composition of claim 2 wherein said sulfonated polymer contains from about 1 to 4 mole % sulfonic acid groups.

6. The composition of claim 2 wherein said oil phase comprises at least 1% by weight of said sulfonated polymer.

7. The composition of claim 1 wherein said acid is a strong acid.

8. The composition of claim 1 wherein said acid is a regenerable acid.

9. The composition of claim 1 wherein said acid is selected from the group consisting of phosphoric acid, sulfuric acid and hydrochloric acid.

10. The composition of claim 9 wherein said acid is sulfuric acid.

11. The composition of claim 9 wherein said acid is polyacrylic acid.

12. The composition of claim 9 wherein said acid is succinic acid.

13. The water-in-oil emulsions of claim 1 wherein the sulfonated polymer has a number average molecular weight of from 5,000 to about 50,000.

14. The water-in-oil emulsions of claim 1 wherein the exterior oil phase constitutes from 30 to 60 weight % of the total emulsion composition.

15. The water-in-oil emulsions of claim 1 wherein the sulfonated polymer is present at from 0.1 to 30 weight % based on weight of solvent.

* * * * *